(12) United States Patent
Hilarides et al.

(10) Patent No.: US 8,454,753 B2
(45) Date of Patent: Jun. 4, 2013

(54) CLEANING BULLET AND METHOD OF OPERATING THE SAME

(75) Inventors: Jim J. Hilarides, Racine, WI (US); Carol A. Rouillard, Loveland, OH (US); Andrew M. Bober, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 240 days.

(21) Appl. No.: 12/922,566

(22) PCT Filed: Mar. 16, 2009

(86) PCT No.: PCT/US2009/037264
§ 371 (c)(1),
(2), (4) Date: Sep. 14, 2010

(87) PCT Pub. No.: WO2009/114845
PCT Pub. Date: Sep. 17, 2009

(65) Prior Publication Data
US 2011/0017233 A1 Jan. 27, 2011

Related U.S. Application Data

(60) Provisional application No. 61/087,901, filed on Aug. 11, 2008, provisional application No. 61/036,582, filed on Mar. 14, 2008.

(51) Int. Cl.
*B08B 1/02* (2006.01)
(52) U.S. Cl.
USPC .......................... 134/8; 134/22.1; 15/104.05
(58) Field of Classification Search
USPC .................. 134/8, 22.1; 15/104.05; 198/494, 198/497–499
See application file for complete search history.

(56) References Cited

U.S. PATENT DOCUMENTS

| | | | |
|---|---|---|---|
| 2,858,556 A * | 11/1958 | van der Lans | 15/104.31 |
| 4,418,437 A * | 12/1983 | French | 15/104.09 |
| 5,565,633 A * | 10/1996 | Wernicke | 73/865.8 |
| 7,328,475 B2 | 2/2008 | Smith et al. | |
| 7,743,450 B2 | 6/2010 | Rouillard et al. | |
| 7,752,700 B2 | 7/2010 | Rouillard et al. | |
| 2005/0268940 A1 | 12/2005 | Vohra | |
| 2007/0056606 A1 | 3/2007 | Rouillard et al. | |

FOREIGN PATENT DOCUMENTS

| | | |
|---|---|---|
| CN | 2706251 | 6/2005 |
| FR | 2894855 | 6/2007 |
| GB | 2287767 A * | 9/1995 |

(Continued)

OTHER PUBLICATIONS

The International Search Report prepared by the Korean Intellectual Property Office for PCT/US2009/037264, Dated Sep. 23, 2009.

*Primary Examiner* — Michael Kornakov
*Assistant Examiner* — Natasha Campbell
(74) *Attorney, Agent, or Firm* — Michael Best & Friedrich LLP

(57) ABSTRACT

A cleaning bullet for use in a track can include a compressible body to clean the track, and a motorized device to propel the body through the track. In some embodiments, the motorized device includes wheels rotatably coupled to the device, a motor to drive the wheels, and a power source to supply power to the motor. Also, in some embodiments, one or more wheels engage an inner or outer surface of the track to move the motorized device along the track.

20 Claims, 14 Drawing Sheets

FOREIGN PATENT DOCUMENTS

| | | |
|---|---|---|
| JP | 51-090556 | 7/1976 |
| JP | 2002-220049 | 8/2002 |
| KR | 10-2001-0044631 | 6/2001 |
| KR | 10-0770976 | 10/2007 |

* cited by examiner

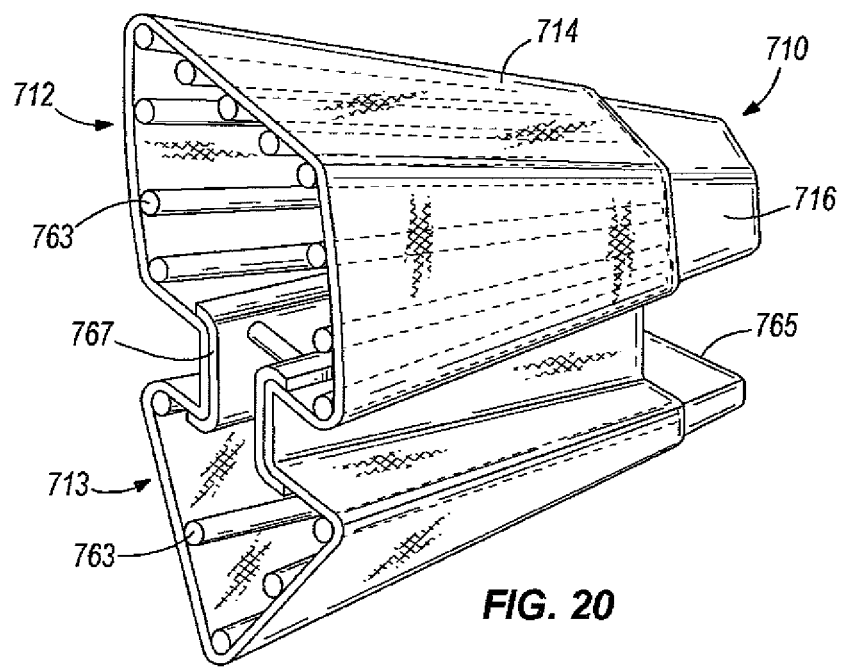
FIG. 20
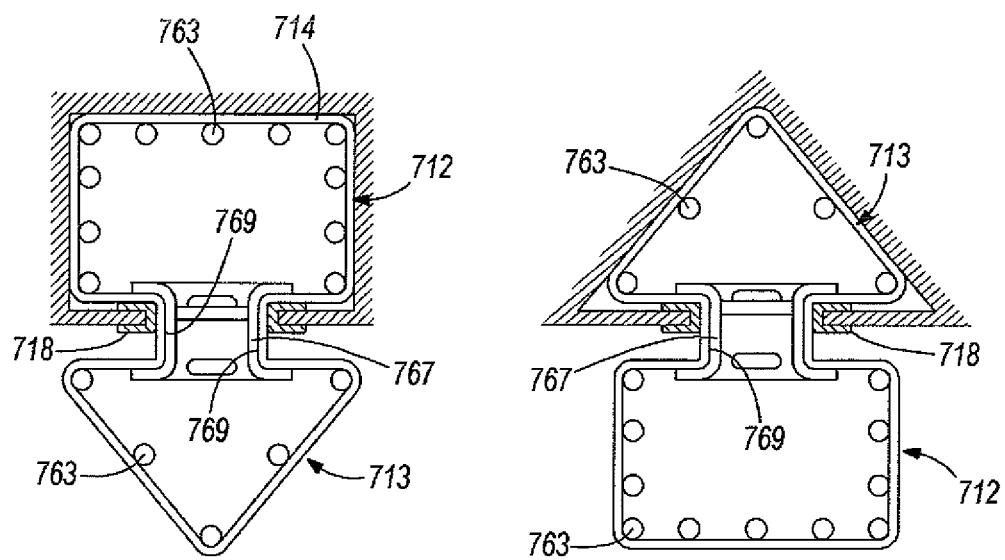
FIG. 21  FIG. 22

CLEANING BULLET AND METHOD OF OPERATING THE SAME

CROSS-REFERENCE TO RELATED APPLICATIONS

This application claims priority to U.S. patent application No. 61/036,582, filed Mar. 14, 2008, and U.S. patent application No. 61/087,901, filed Aug. 11, 2008.

BACKGROUND

Conveyor systems are used in a number of different industries to transport items of all types. Some types of conveyor systems include a track having an interior along which a portion of the conveyor system and/or a portion of items conveyed by the conveyor system pass. By way of example with reference to the beverage industry, some conveyor systems are used to transport bottles by the bottle neck, wherein the top of each bottle extends into an interior space of an elongated track along which the bottles are transported. The elongated tracks of these conveyor systems typically include a longitudinal slot through which the neck of the bottle extends. In some cases, compressed air directed at various portions of the bottle or to a conveyor element connected to and movable along the track with the bottle urges the bottle along the conveyor path. In other cases, other mechanisms are used to move the bottles carried by the elongated track.

Regardless of the type of items conveyed by the conveyor system having a track with an interior conveying area as described above, the interior of the track can accumulate dust, microorganisms, and other contaminants during operation. In many applications (e.g., in beverage bottle conveying applications), this not only presents problems with movement of items along the conveyor, but can also present an unacceptable risk of bottle and beverage contamination. As a result, the track must be cleaned on a regular basis to ensure proper operation and sanitation. Track cleaning is currently typically performed manually by laboriously wiping the track with a dampened cloth. Since the conveyor track is typically overhead, this cleaning requires the use of lift devices that increase the time and cost of the cleaning.

Pipeline "pigs" are often used to clean the interior surfaces of long stretches of pipe. The pig is typically propelled through the pipe by a compressed fluid flowing through the pipe, thereby dislodging contaminants adhering to the interior walls of the pipe. The pigs typically include a body having an outer circumference that conforms to the interior of the pipe being cleaned, and must be in an enclosed pipe in order to operate effectively.

U.S. Patent Application Publication No. 2007/0251038 discloses a novel system for cleaning a conveyor by using air currents from the conveyor to move a pig or bullet along the conveyor track. This system includes a cleaning body within the track and a body located outside the track to capture air currents and to thereby drive the cleaning body.

A need exists for a cleaning device that can operate in conveyor tracks with sufficient friction to clean soiling typically found in such tracks, and that can efficiently and quickly clean conveyor tracks with reduced manpower. New devices for cleaning conveyor tracks therefore continue to be welcome in the art.

SUMMARY OF THE INVENTION

Some embodiments of the present invention relate to a cleaning bullet that can operate effectively in tracks (e.g., slotted tracks) of a conveyor to clean interior surfaces of such tracks. The cleaning bullet can be propelled along the track under power provided by the cleaning bullet, rather than under power provided by the conveyor. In some embodiments, the bullet is provided with a motorized device that propels the bullet through the track. A method for cleaning an interior wall of a conveyor track is also provided.

Some embodiments relate to a cleaning bullet for use in a track, the track comprising an elongate path along which items to be conveyed are moveable. The cleaning bullet comprising a body operable to move along the track; at least one wheel coupled to the body and engaging the track; a motor operably coupled to the at least one wheel to rotate the wheel and move the body and wheel along the track; and a power source coupled to the motor.

Some embodiments relate to a cleaning bullet for cleaning at least one surface of a track. The cleaning bullet comprising a body operable to move along the track in at least a first direction; a cleaning implement coupled to the body for rotation relative to the body, the cleaning implement comprising at least one abrasive member and at least one flexible sheet operable to engage an interior surface of the track; and a motor operable to move the body and cleaning implement along the track in the first direction.

Some embodiments relate to a method of cleaning a track with a cleaning bullet. The method comprises inserting a cleaning bullet into the track; moving the cleaning bullet along the track in a first direction with a motor; supplying power to the motor with a power source carried by the cleaning bullet; and rubbing at least one interior surface of the track with at least one of an sheet member and an abrasive member as the cleaning bullet moves along the track.

Further aspects of the present invention, together with the organization and operation thereof, will become apparent from the following detailed description of the invention when taken in conjunction with the accompanying drawings.

BRIEF SUMMARY OF THE DRAWINGS

FIG. 20 is a perspective view of another cleaning bullet cleaning implement according to another embodiment of the present invention.

FIG. 21 is an end view of the cleaning implement of FIG. 20, shown in a first state of operation.

FIG. 22 is an end view of the cleaning implement of FIGS. 20 and 21, shown in a second state of operation.

Figure 1:
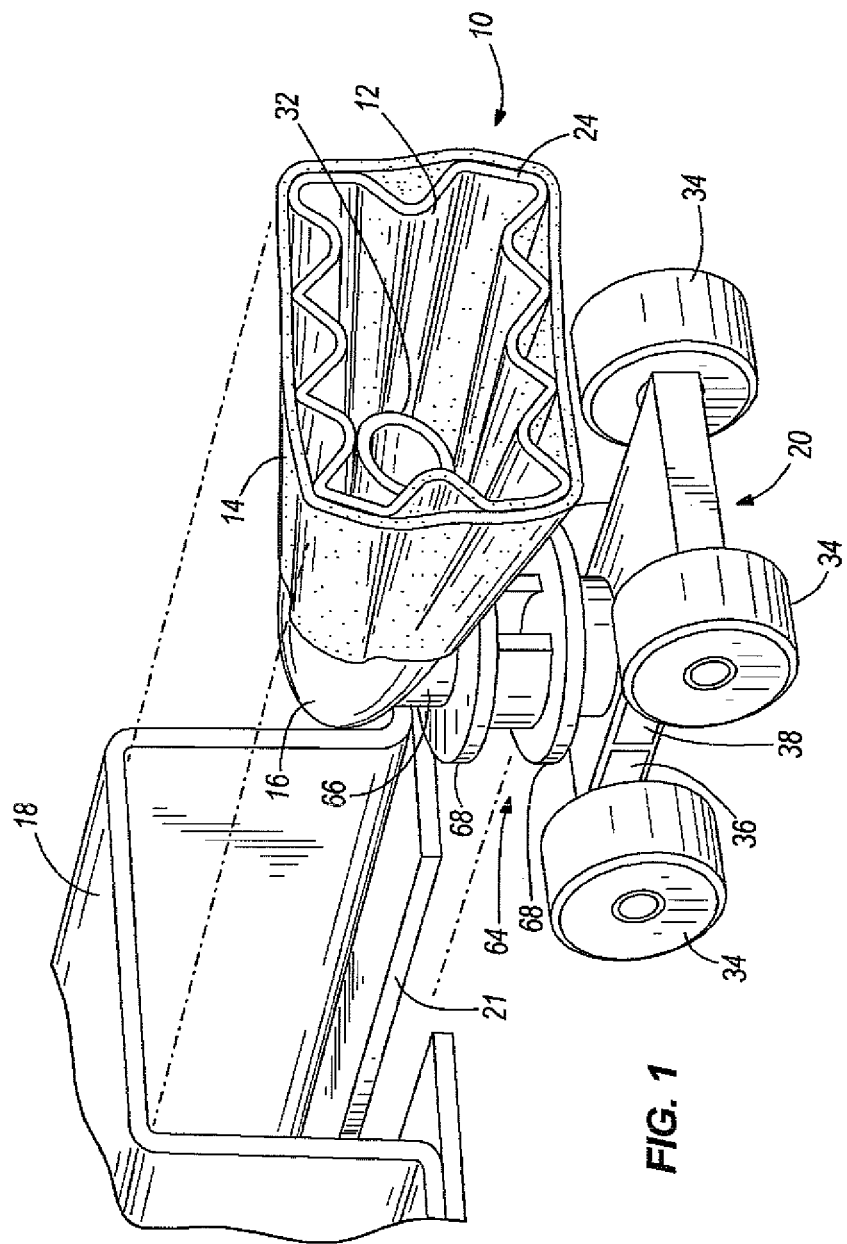
FIG. 1 is a perspective view of a cleaning bullet according to an embodiment of the present invention.

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

DETAILED DESCRIPTION

A cleaning bullet 10 suitable cleaning slotted tracks 18 (e.g., such as those used in air conveyors and in other types of conveyors), is illustrated in FIGS. 1-7. The bullet 10 includes a body 12 propelled through the track 18 via a motive force provided from the bullet 10 itself. As illustrated, the motive force can be provided by a motorized device 20 coupled to the body 12. The motorized device 20 can engage the track 18 to propel the body 12 through the track 18. As the body 12 is propelled through the track 18, the body 12 engages interior walls of the track 18 to clean them.

As illustrated in FIGS. 1-3, 5, and 6, a sheet 14 can be fixed to the body 12 to engage the interior walls of the track 18 to dislodge contaminants, particles, debris, and the like from the interior walls, and to clean the track interior. In some embodiments, this sheet 14 is disposable. The body 10 of some embodiments can be formed from a material adapted to clean the track 18 and as such, a disposable sheet 14 is not necessary for all embodiments.

Also, as illustrated, some embodiments of the bullet 10 include a nose 16. The nose 16 is coupled to the body 12, and in some embodiments can couple the sheet 14 to the body 12. This nose 16 can also help direct the bullet 10 around bends, corners, and the like within the track 18.

The body 12 can be take a number of different forms suitable for cleaning the inside of the track 18. For example, in the illustrated embodiment of FIGS. 1-7, the body 12 is formed from a foam or other compressible material that, when compressed, exerts a biasing force against the inside of the track 18, thereby conforming to the interior shape of the track 18 for a more thorough cleaning process as the body 12 moves along the track 18. The compressible body 12 allows the same bullet 10 to be used in tracks 18 having different cross sectional shapes and sizes. In some embodiments, the body 12 can have a hollow flexible shell that expands to conform to an interior shape of the track 18. For example, the body 12 of the embodiment illustrated in FIGS. 1-7 comprises a pleated, hollow, undulating wall that allows the body 12 to deform or otherwise conform to the inner surfaces of the track 18. In other embodiments, the body 12 can be constructed in a manner shown in FIG. 1 of pending U.S. patent application Ser. No. 11/226,474, which is hereby incorporated herein by reference.

The body 12 can comprise plastic, paper, metal, wood, cork, foam, polymeric materials, or any combination thereof. In some embodiments, the body 12 comprises an absorbent sponge-like material, such as foamed polyurethane, that can be saturated with water, a cleaning solution, or other fluid that will clean, and in some embodiments disinfect, the interior walls of the track 18 on contact. Depending at least in part upon the materials used to create the body 12, the body 12 can be formed by die cutting, bending operations, molding, thermoforming, or in any other suitable manner.

In the illustrated embodiment of FIGS. 1-7, the body 12 includes a frustoconical leading end extending to a generally rectangular trailing end 24 along a body axis 26 for use in a track having a square or generally rectangular interior cross sectional shape. Of course, the trailing end 24 can be shaped in any other manner (e.g., a round, oval, or other rotund cross-sectional shape, a triangular or other polygonal cross-sectional shape, an irregular cross-sectional shape, and the like) to conform to the particular interior shape of the pipe or track being cleaned.

The sheet 14 in the embodiment of FIGS. 1-7 is draped over the leading end of the body 12, and extends rearwardly over the body 12. In some embodiments, the sheet 14 comprises a micro fiber material known to efficiently clean surfaces. However, the sheet 14 can instead be formed from any other material suitable for the particular application, such as cotton, wool, or other natural material, fabric, paper, plastic or other synthetic material, and the like, and can be a woven or non-woven material. The sheet 14 can be form fitted to the body 12 to minimize bunching and the resulting excess friction caused by a bunched sheet 14 against interior walls of the track 18. The sheet 14 can be used dry, or can be soaked in a fluid (e.g., water, a cleaning solution, and the like) that can clean and/or disinfect the interior walls of the track 18. The sheet 14 can be soaked prior to or after securing the sheet 14 to the cleaning bullet body 12. Also or instead, if the body 12 comprises an absorbent material, the body can receive and absorb fluid for releasing the fluid as the bullet 10 moves along the track 18.

With continued reference to the illustrated embodiment of FIGS. 1-7, a coupling 32 can be located inside the body 12. In some embodiments, this coupling 32 can be used to couple the body 12 to the nose 16 of the bullet 10. Additionally, in some embodiments (such as in the illustrated embodiment of FIGS. 1-7), the coupling 32 also couples the sheet 14 to the body 12 when the nose 16 is secured to the body 12. Specifically, the sheet 14 can be trapped between the body 12 and the nose 16. The coupling 32 can be a fastener, such as a threaded fastener. However, the coupling 32 can also or instead include any structure or device employing friction fits, snap fits, detents, and the like to hold two members together. Other devices and methods for fixing the nose 16 relative to the body 12 can be used, such as mating threads on the nose 16 and body 12, other mechanical fasteners, a snap fit between the nose 16 and the body 12, adhesive or cohesive bonding material, and the like, without departing from the spirit and scope of the invention.

In some embodiments, the nose 16 includes a rounded front end to assist in directing the bullet 10 along the track 18. In other embodiments, the nose 16 has a cruciform, star, or other cross-sectional shape that can be utilized to couple the sheet 14 to the body 12 as will be described below. Any other nose shape suitable for movement of the bullet 10 along the interior of the track 18 can be used, and falls within the spirit and scope of the present invention.

The embodiment of the cleaning bullet 10 illustrated in FIGS. 1-7 includes an alignment key 64 especially suited for guiding the cleaning bullet 10 in conveyor track 18 having a longitudinal slot 21 for conveying items (e.g., beverage bottles 29, in some embodiments). The alignment key 64 can be integrally formed with the nose 16 to define a single integral element. However, in other embodiments, the alignment key 64 is coupled to the nose in any suitable manner, or can instead be coupled directly to the body 12 of the cleaning bullet 10. The alignment key 64 can have any shape suitable for extending through the longitudinal slot 21 while also permitting movement of the cleaning bullet 10 along the track 18. For example, the illustrated alignment key 64 includes a shaft 66 extending through the longitudinal slot 21 of the track 18. As illustrated, two discs 68 on the shaft 66 are spaced a sufficient distance apart to allow a gap 21 defined therebetween to receive a wall of the track 18 of the conveyor.

In some embodiments, the alignment key 64 centers the bullet 10 in the track 18 to maintain the disposable sheet 14 in contact with the interior walls of the track 18. Of course, the shape of the alignment key 64 can be modified for use in other tracks without departing from the spirit and scope of the present invention. For example, in some embodiments, the shaft 66 of the alignment key 64 has an adjustable length to change the distance between the wheels 34 of the bullet 10 (described below) and the body 12. This adjustable length can be provided by a two-part shaft 66 connected together and adjustable in length in a variety of different manners, such as one portion of the shaft 66 threaded into and out of another portion of the shaft 66, one portion of the shaft 66 slidably received within the other portion of the shaft 66 in a telescoping manner (and secured in two or more positions by a pin, detent, or other fastener), and the like. Still other types of adjustable shafts can be used to adapt the cleaning bullet 10 to tracks 18 of different types.

Although an alignment key 64 formed with the nose 16 is disclosed, the alignment key 64 can be omitted when the cleaning bullet 10 is used in an enclosed pipe (e.g., a pipe not having a longitudinal slot). Additionally, in some embodiments, the alignment key 64 does not need to include the second, or outer, disc 68 on the outside of the track 18. For example, in the illustrated embodiment, only the disc 68 inside the track 18 is necessary, because wheels 34 on the motorized device 20 can serve the same purpose as the outer disc 68. Additionally, the inner disc 68 can be replaced by or supplemented with other bearing-type devices, such as rollers, shoulders having other shapes, low-friction pads secured to the shaft 66, and the like.

As described above, the cleaning bullet 10 can include a motorized device 20 to drive the cleaning bullet 10 along the track 18. In some embodiments, the motorized device 20 is coupled to the alignment key 64, and includes wheels 34, a motor 36, and a power source 38 (e.g., a battery). The motorized device 20 can also include a frame to support the motor 36 and the power source 38. The frame can be attached to the alignment key 64, or can be integral with the alignment key 64. In other embodiments, the motor 36 and/or the power source 38 can be positioned substantially within the shaft 66 of the alignment key 64, and the wheels 34 can be rotatably coupled directly to the alignment key 64.

Figure 2:
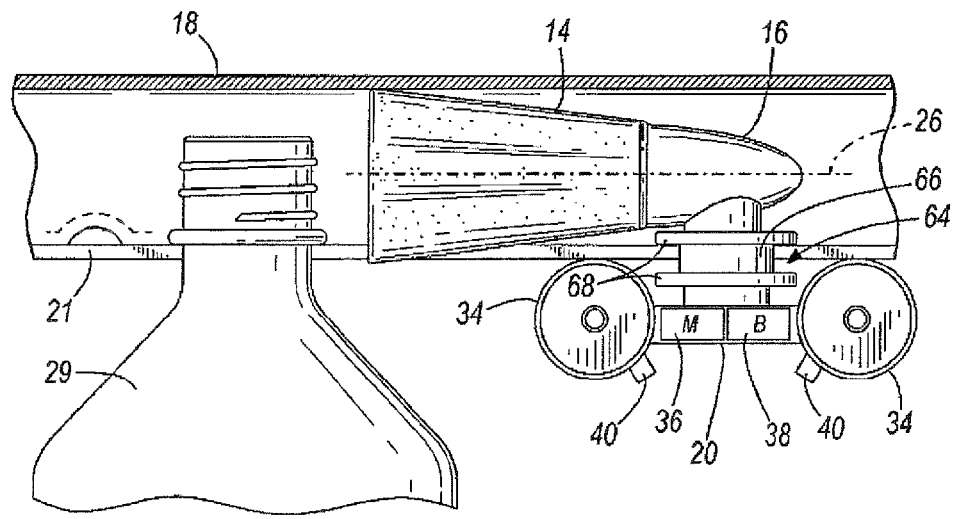
FIG. 2 is a side view of the cleaning bullet illustrated in FIG. 1, shown in operation in a conveyor track.
Figure 3:
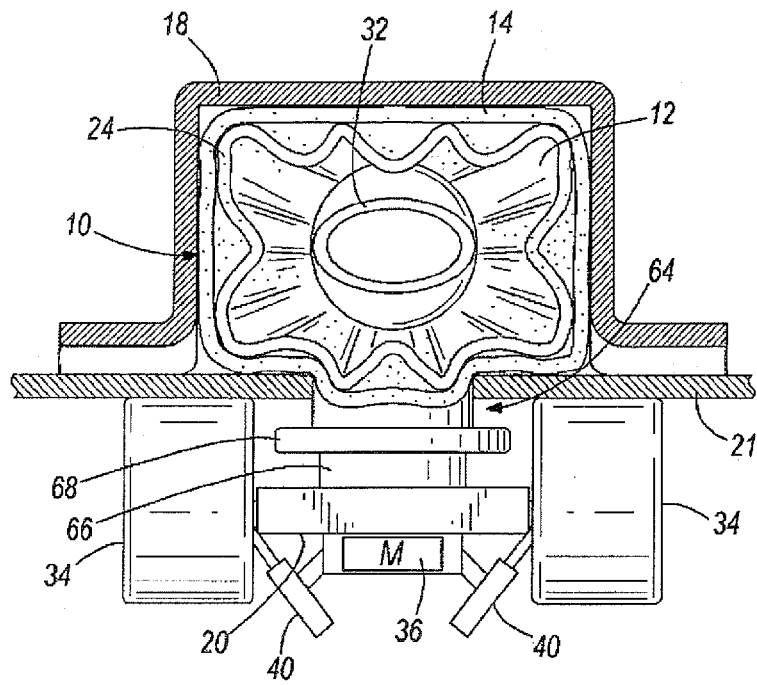
FIG. 3 is rear view of the cleaning bullet illustrated in FIGS. 1 and 2.
Figure 4:
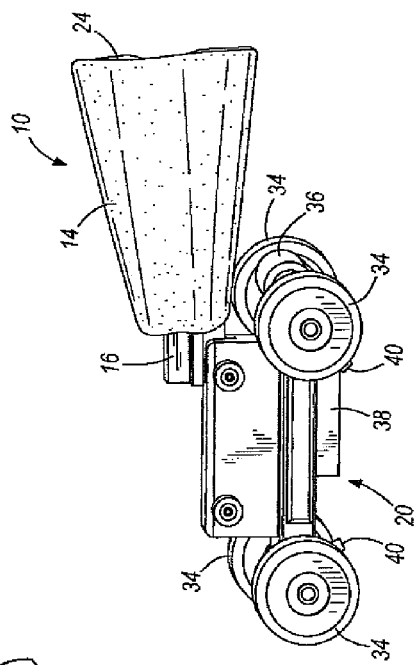
FIG. 4 is a rear perspective view of the cleaning bullet illustrated in FIGS. 1-3, shown in operation in a conveyor track.
Figure 5:
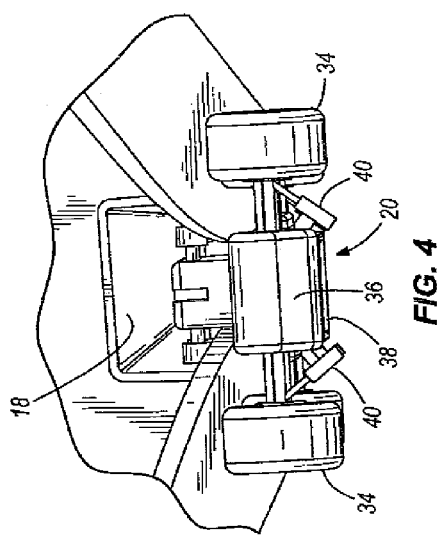
FIG. 5 is a side perspective view of the cleaning bullet illustrated in FIGS. 1-4.
Figure 7:
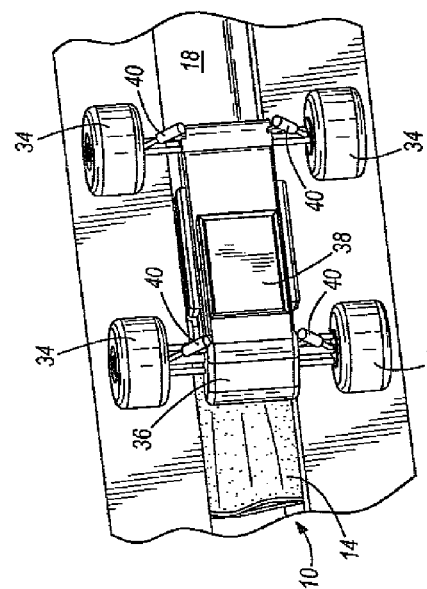
FIG. 7 is a bottom view of the cleaning bullet illustrated in FIGS. 1-6, shown in operation in a conveyor track.
Figure 6:
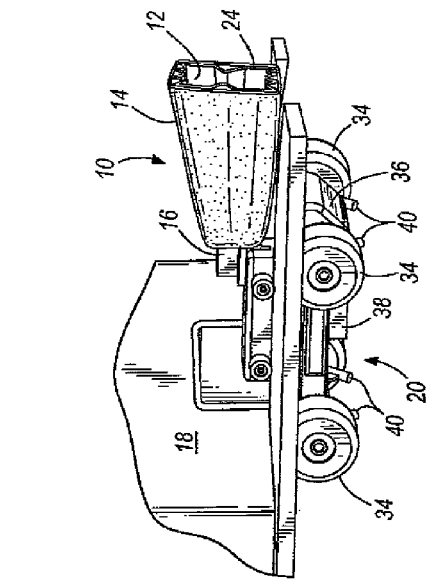
FIG. 6 is a side view of the cleaning bullet illustrated in FIGS. 1-5, shown partially inserted into a conveyor track.
Figure 8:
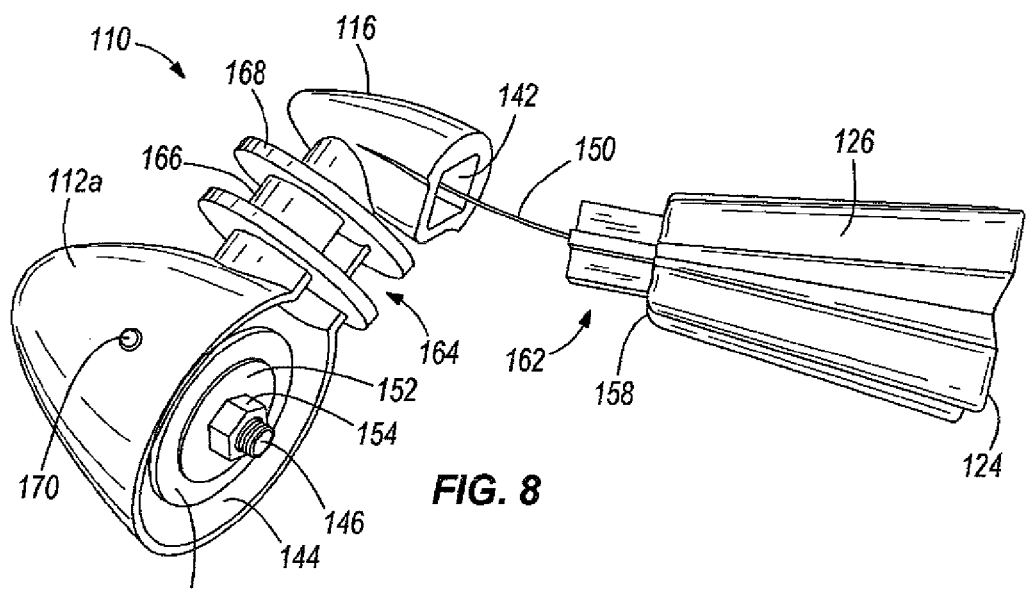
FIG. 8 is a perspective view of a cleaning bullet according to another embodiment of the present invention.
Figure 9:
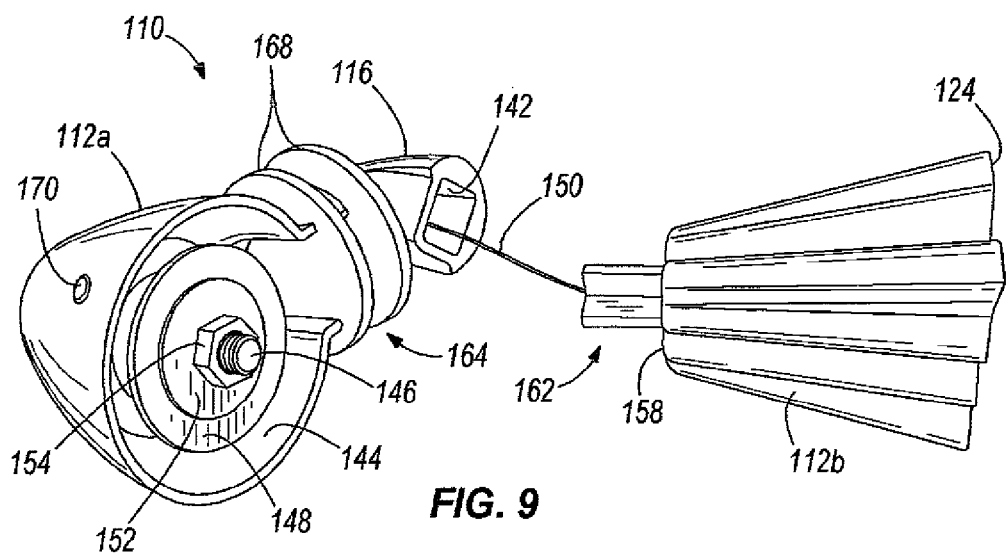
FIG. 9 is another perspective view of the cleaning bullet illustrated in FIG. 8.
Figure 10:
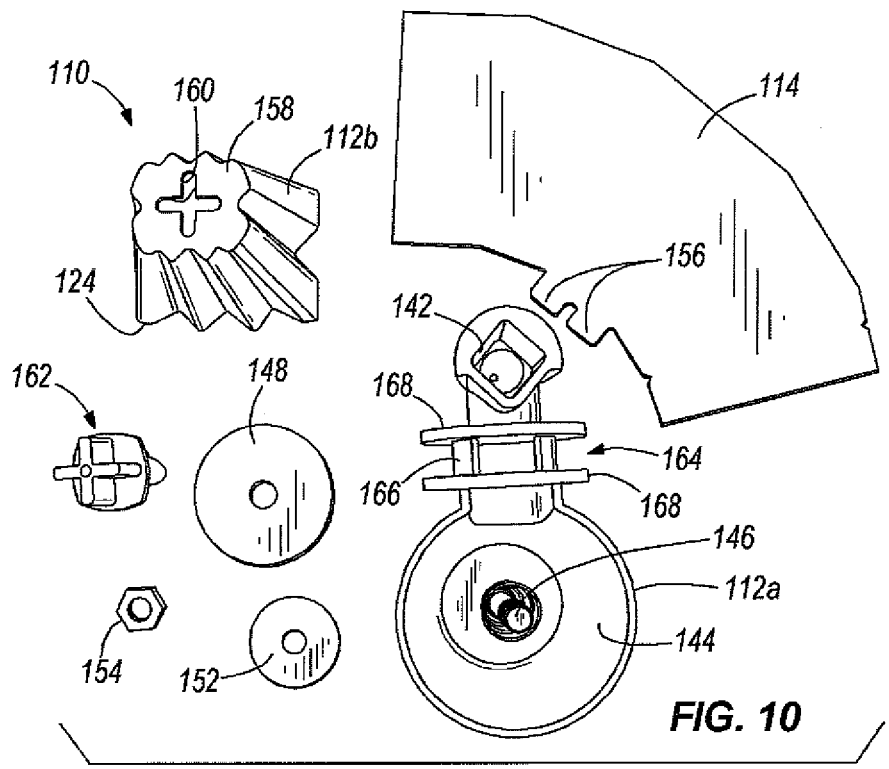
FIG. 10 is a top disassembled view of the cleaning bullet illustrated in FIGS. 8 and 9.
Figure 11:
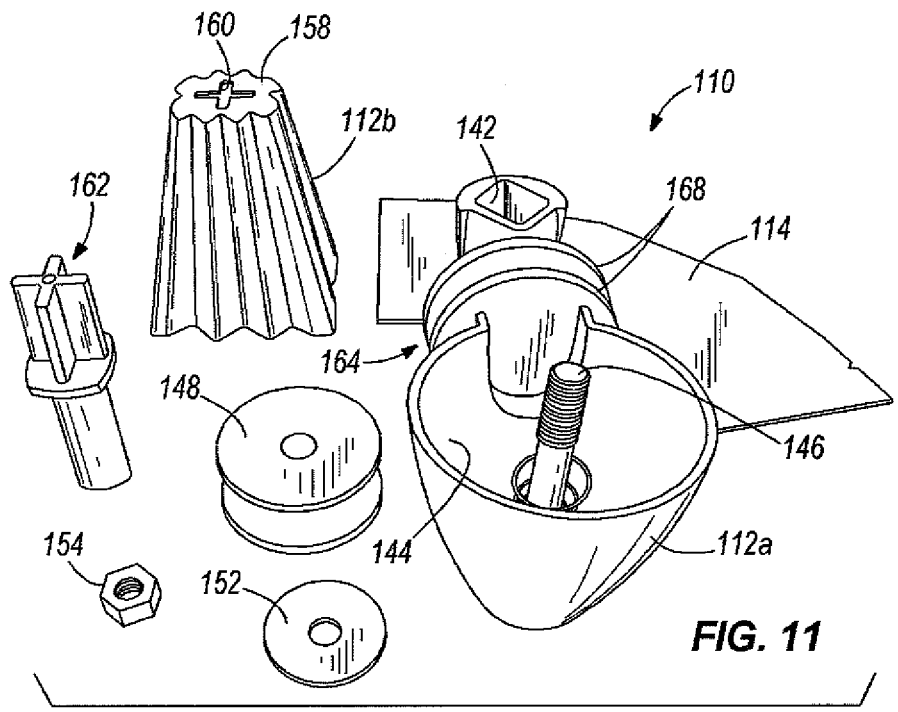
FIG. 11 is another perspective disassembled view of the cleaning bullet illustrated in FIGS. 8-10.
Figure 12:
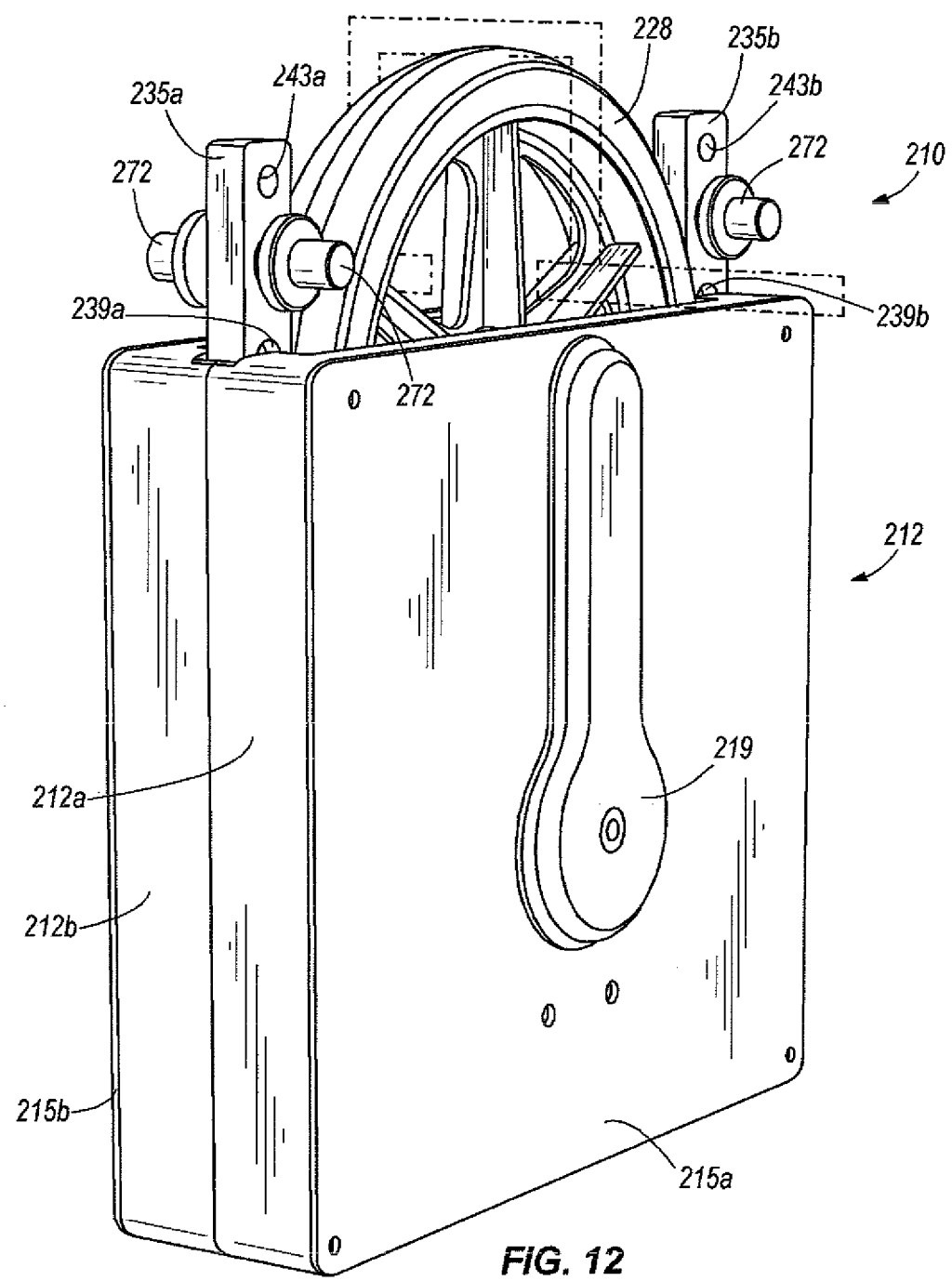
FIG. 12 is a perspective view of a cleaning bullet according to another embodiment of the present invention.

In the illustrated embodiment of FIGS. 4-7, the wheels 34 are rotatably coupled to a frame and are driven by the motor 36 to move the device 20 along the track 18. In some embodiments, all wheels 34 of the device 20 are powered by the motor 36, whereas in other embodiments, one or more of the wheels 34 are idler wheels, and are not powered by the motor 36. As shown in FIGS. 2 and 3, the wheels 34 can contact a lower surface of the track 18 with little or no slack between the wheels 34 and the track 18. Also, the motorized device 20 can include shocks 40 to bias the wheels 34 against the track 18 such that the wheels 34 do not slip relative to the track 18 while the wheels 34 rotate. The illustrated shocks 40 can be, for example, spring-biased shocks that push the wheels 34 upward toward the track 18.

In other embodiments, the motorized device 20 and/or the wheels 34 can include further features to inhibit slip between the wheels 34 and the track 18. For example, the wheels 34 can include soft rubber tires that partially compress against the lower surface of the track 18, and/or the tires may be under-inflated such that they deform when engaging the track 18. As another example, in some embodiments, the shocks 40 can be replaced with electrical or hydraulic actuators that move the wheels 34 into and out of engagement with the lower surface of the track 18. In such embodiments, an operator can manually or remotely articulate the actuators to tilt the wheels 34.

The motor 36 can be, for example, an electric AC motor, a brushless DC motor, or any other suitable primer mover. In the illustrated embodiment of FIGS. 1-7, the power source 38 is electrically coupled to the motor 36 to provide power to the motor 36. In some embodiments, the power source 38 is a rechargeable battery or battery pack. In other embodiments, the motorized device 20 can include a cord to power the motor 36 or charge the power source 38 through a wall outlet or other source of electrical power. In still other embodiments, the motor 36 may be replaced by a small, two-stroke internal combustion engine, and the power source 38 may be a fuel supply of, for example, gasoline.

In the illustrated embodiment, the motorized device 20 is a radio controlled (RC) motorized vehicle (i.e., car or cart). Accordingly, the device 20 can include a controller such that a user can remotely operate or "drive" the device 20 along the track 18. In other embodiments, the device 20 is not remotely operated, in which embodiment the motorized device 20 can automatically run (e.g., the motor 36 drives the wheels 34) whenever the device 20 is turned on.

In use, the cleaning bullet 10 can be inserted into an open end of a track 18. If included, the key 64 can be engaged with the slot 21 of the track 18 to guide the bullet 10 in the track 18. The wheels 34 can engage the outer surface of the track 18. The motor 36 can be turned on such that the wheels 34 rotate. For example, a user can operate a controller to drive the motorized device 20 along the track 18. The bullet 10 can thereby be propelled through the track 18 using the motive force provided by the device 20, thereby cleaning the track 18. When the cleaning bullet 10 reaches an opposite open end of the track 18, the motor 36 can be turned off, and the bullet 10 can be removed from the track 18. If necessary, the sheet 14 and/or the body 12 can be cleaned or replaced such that the bullet 10 can be reinserted into the track 18 to clean the track 18 again.

In some embodiments, the bullet 10 is used to clean an enclosed track without a longitudinal slot (e.g., a pipe). In such embodiments, the motorized device 20 can be coupled directly to the nose 16 of the bullet 10. The device 20 can therefore be inserted into an open end of the enclosed track in front of or behind the body 12 such that the device 20 rides inside the track and pulls or pushes the body 12 and the sheet 14 along. When the motorized device 20 reaches the opposite end of the enclosed track, the entire cleaning bullet 10 can be removed from the enclosed track.

FIGS. 8-11 illustrate another embodiment of a cleaning bullet 110 according to the present invention. The embodiment of the cleaning bullet 110 illustrated in FIGS. 8-11 employs much of the same structure and has many of the same properties as the embodiments of the cleaning bullets described above in connection with FIGS. 1-7. Accordingly, the following description focuses primarily upon structure and features that are different than the embodiments described above in connection with FIGS. 1-7. Reference should be made to the description above in connection with FIGS. 1-7 for additional information regarding the structure and features, and possible alternatives to the structure and features of the cleaning bullet 110 illustrated in FIGS. 8-11 and described below. Features and elements in the embodiment of FIGS. 8-11 corresponding to features and elements in the embodiments described above in connection with FIGS. 1-7 are numbered in the 100 series of reference numbers.

The bullet 110 illustrated in FIGS. 8-11 includes a first body 112a and a second body 112b adapted to be moved along and through a track (not specifically illustrated, but shown in FIGS. 1-7). In some embodiments, the first body 112a and/or the second body 112b comprise plastic, paper, metal, wood, cork, foam, polymeric materials, or any combination thereof. The second body 112b can have any of the forms and be constructed of any of the materials described above in connection with the body 12 in the embodiments of FIGS. 8-11. For example, the second body 112b can be an absorbent material (e.g., foam) saturated with water, a cleaning solution, or other fluid that will clean, and in some embodiments disinfect, the interior walls of a track 18. Depending at least in part upon the materials used to create the body 12, the body 12 can be formed by die cutting, bending operations, molding, thermoforming, or in any other suitable manner.

Also, as illustrated in FIGS. 8-11, some embodiments of the bullet 110 include a nose 116. The nose 116 can be coupled to or be defined by the first body 112a. As discussed above, the nose 116 can have a frustoconical leading end that can help direct the bullet 110 around bends, corners, and the like within the track. The nose 116 can extend toward the second body 112b to define a generally rectangular aperture 142 which, in some embodiments, is shaped to receive a portion of the second body 112b (e.g., peg 162, described in greater detail below). The first body 112a can also include an alignment key 164 operable to engage a track and substantially align the first body 112a with the track as described above. Similar to the embodiment of FIGS. 1-7, the alignment key 164 can include a shaft 166 and a pair of discs 168, although other configurations are possible.

The first body 112a can further include a concave portion 144 operable to receive a stud 146. The illustrated stud 146 extends within the concave portion 144 in substantially the same direction as the nose 116. In the illustrated embodiment, a spool 148 is coupled for rotation about the stud 146. The illustrated spool 148 includes a line 150 wrapped around the spool 148. The line 150 can comprise, for example, string, wire, thread, tape, or any other elongated flexible element made from plastic, nylon, metal, or any other material capable of carrying a load in tension. A washer 152 and a nut 154 can be coupled to the stud 146 to retain the spool 148 on the stud 146 and within the concave portion 144 of the first body 112a. In some embodiments, the line 150 can extend toward the nose 116 and through the aperture 142.

The second body 112b shown in FIGS. 8-11 includes a trailing end 124 having a substantially rectangular cross sectional shape for use in a track having a square or generally rectangular cross section. The shape of the trailing end 124 can have any other shape to conform to the particular shape of a track being cleaned, including any of the trailing end shapes described above in connection with the embodiment of FIGS. 1-7.

The sheet 114 in the embodiment of FIGS. 8-11 can be coupled to the second body 112b to engage, wipe, and clean interior walls of the track. The illustrated sheet 114 is draped over the leading end of the second body 112b and extends away from the first body 112a. In some embodiments, the sheet 114 comprises a micro fiber material known to efficiently clean surfaces. However, the sheet 14 can instead be formed from any other material suitable for the particular application, such as cotton, wool, or other natural material, fabric, paper, plastic or other synthetic material, and the like, and can be a woven or non-woven material. The sheet 114 can be used dry, or can be soaked in a fluid (e.g., water, a cleaning solution, and the like) that can clean and/or disinfect the interior walls of a track. The sheet 114 can be soaked prior to or after securing the sheet 114 to the second body 112b. Also or instead, if the second body 112b comprises an absorbent material, the second body 112b can receive and absorb fluid for releasing the fluid as the bullet 110 moves along a track.

The sheet 114 illustrated in the embodiment of FIGS. 8-11 has a substantially arcuate shape when laid flat, such that the sheet 114 can be wrapped around the second body 112b. The illustrated sheet 114 further includes flaps 156 that can be positioned on the sheet 114 to be trapped between the first and second bodies 112a, 112b when the first and second bodies 112a, 112b are pushed together as will be described in greater detail below. In this regard, the flaps 156 can be shaped to correspond to the shape of the peg 162 (also described below). As discussed above, the sheet 114 can be disposable, or can be washable and/or reusable.

The illustrated second body 112b has a pleated, hollow, undulating shape covered by the sheet 114. Also, the second body 112b can have a front portion 158 having a cruciform slot 160. In some embodiments, the flaps 156 of the sheet 114 are engageable with at least a portion of the cruciform slot 160. A peg 162 can extend through the cruciform slot 160 in the second body 112b. The flaps 156 can be at least partially inserted into the cruciform slot 160 and be retained there by the peg 162, or can be trapped between and retained by the first and second bodies 112a, 112b. In some embodiments, the aperture 142 of the first body 112a receives the peg 162 of the second body 112b in releasable mating engagement (although the male-female relationship between the second body 112b and the first body 112a can be reversed, in other embodiments).

The line 150 can also be coupled to the peg 162 to connect the first body 112a to the second body 112b. The line 150 can be wrapped around the spool 148 and can be unwrapped from the spool 148 to alter the distance between the first body 112a and the second body 112b. In some embodiments, a user-actuatable control 170 (such as the button illustrated on the first body 112a) is coupled to the spool 148, and can be pressed by a user to retract the line 150 around the spool 148 by permitting rotation of the spool 148 under force of a torsion spring (not shown) coupled to the spool 148.

In operation, the first body 112a can be directed down a length of track, such as by air power or in any other manner used to convey items along the track. While the first body 112a is conveyed down the track, the second body 112b is retained in a desired location at which track cleaning is to begin. Upon reaching another desired location a distance along the track from the second body 112, the first body 112a can be removed from the track by a user, and the user can pull the line 150 to draw the second body 112b and the sheet 114 along the track. In some embodiments, the user-actuatable control 170 is used to retract the line 150 about the spool 48. Depending at least in part upon the strength of the spring biasing the spool 148 to rotate, this action can also help to draw the second body 112b and the sheet 114 along the track. In another embodiment, the length of line can be determined by a user for each length of track, such that for a serpentine-like track, a shorter length of the line 150 can be pulled from the spool 148, whereas for more linear tracks, a longer length of line 150 can be pulled from the spool 148.

FIGS. 12-18 illustrate another embodiment of a cleaning bullet 210 according to the present invention. The embodiment of the cleaning bullet 210 illustrated in FIGS. 12-18 employs much of the same structure and has many of the same properties as the embodiments of the cleaning bullets described above in connection with FIGS. 1-11. Accordingly, the following description focuses primarily upon structure and features that are different than the embodiments described above in connection with FIGS. 1-11. Reference should be made to the description above in connection with FIGS. 1-11 for additional information regarding the structure and features, and possible alternatives to the structure and features of the cleaning bullet 210 illustrated in FIGS. 12-18 and described below. Features and elements in the embodiment of FIGS. 12-18 corresponding to features and elements in the embodiments described above in connection with of FIGS. 1-11 are numbered in the 200 series of reference numbers.

Figure 16:
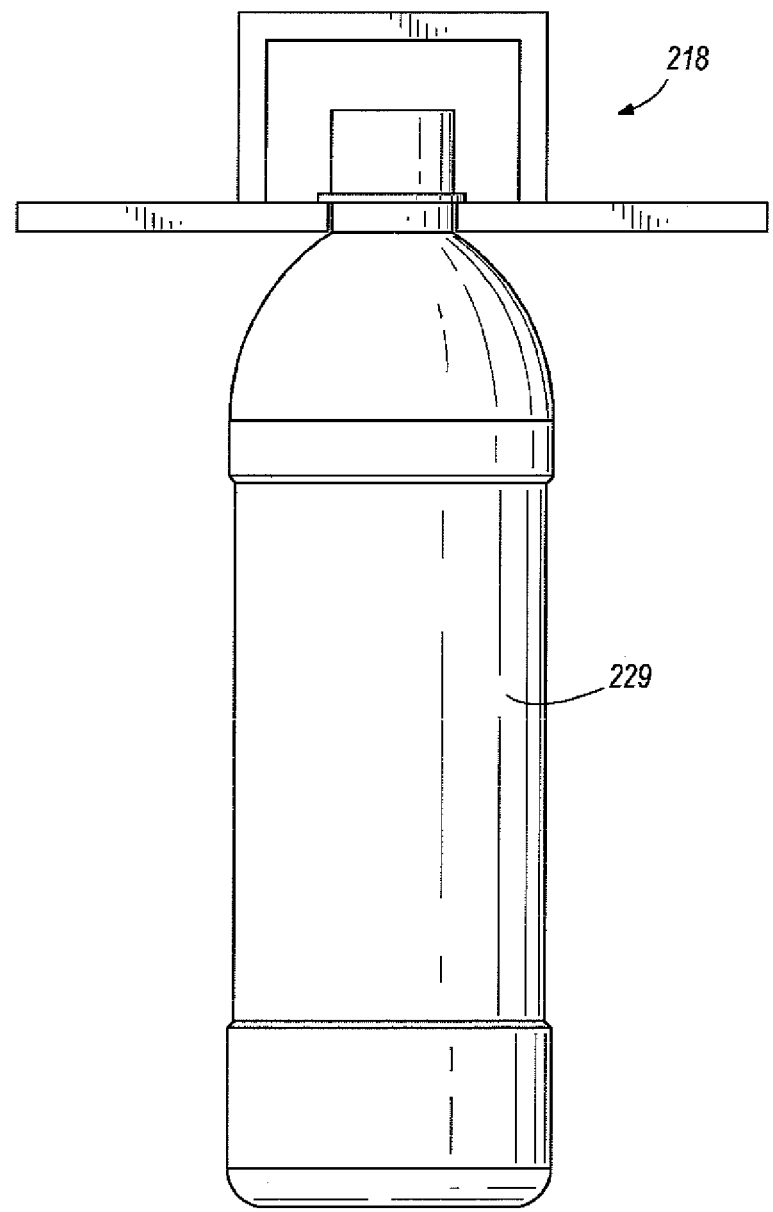
FIG. 16 is an end view of a bottle within the conveyor track of FIG. 15.

The cleaning bullet 210 illustrated in FIGS. 12-15, 17, and 18 includes a body 212, and can be propelled through a track 218 via a motive force provided by the bullet 210 itself. Various track profiles are shown at the top of FIG. 16, as well as a bottle 229 supported on at least some of the track profiles. As shown in FIG. 16, the track profiles include rectangular, square, and triangular track profiles. Other track profile shapes are possible, and can be cleaned by the cleaning bullet 210 illustrated in FIGS. 12-15, 17, and 18. In the illustrated embodiment, the motive force can be provided by a motorized device 220 coupled to the body 212. The motorized device 220 can take any of the forms described above in connection with the embodiment of FIGS. 8-11, and can engage the track 218 to propel the body 212 along the track 218. As the body 212 is propelled along the track 218, the bullet 210 engages interior walls of the track 218 to clean them.

The motorized device 220 in the embodiment of FIGS. 12-15, 17, and 18 can include a motor 236, a drive belt 222, and an axle 223. The motor 236 can be driveably coupled to the drive belt 222 via a rotatable element, such as a first pulley 225a. The drive belt 222 can be drivably coupled to the axle 223 via a second pulley 225b. In the illustrated embodiment, the motor 236 rotates an output shaft 227 that in turn rotates the first pulley 225a. The first pulley 225a moves the drive belt 222, which in turn rotates the second pulley 225b and the axle 223. The axle 223 is drivably coupled to a wheel 228 to cause the wheel 228 to rotate in response to operation of the motor 236. In some embodiments, an axle bushing 230 can be included between the axle 223 and the wheel 228 to permit rotation of the wheel 228 with the axle 223.

Although the motorized device 220 illustrated in FIGS. 12-15, 17, and 18 includes a pair of pulleys 225a, 225b to transfer mechanical power from a motor 236 located outside of a conveyor track 218 to a wheel 228 extending within the conveyor track 218, any other mechanical power transmission assembly can instead be used to perform this same function. By way of example only, the motor 236 can be drivably coupled to the wheel 228 by one or more gears between the motor 236 and the axle 223, by a chain wrapped around sprockets on the output shaft 227 of the motor 236 and the axle 223, by any combination of linkages and cams between the output shaft 227 of the motor 236 and the axle 223, and the like. All such power transmission assemblies can perform the same function of driving the wheel 228 with the motor 236, and fall within the spirit and scope of the present invention.

The motorized device 220 of the cleaning bullet 210 illustrated in FIGS. 12-15, 17, and 18 has a single wheel for engaging the interior of the conveyor track 218. However, in other embodiments, the body 212 of the cleaning bullet 210 can carry any other number of wheels desired. For example, the body 212 of the cleaning bullet 210 can carry two wheels in tandem (e.g., in a manner similar to that described herein for the wheel 228 in the illustrated embodiment). In such embodiments, any number of the wheels 228 can be powered by the motor 236 by suitable power transmission elements as those described above, whereas any number of the wheels 228 can be non-powered (i.e., idler) wheels. In those embodiments having two or more wheels 28 powered by the motor 236 or dedicated motors (such as embodiments in which two or more wheels 228 are positioned in tandem for riding within the conveyor track 218), the opportunity for the motorized device 220 to stall within the conveyor track 218 can be significantly reduced. Such stalling could otherwise occur in the event a single powered wheel 228 encounters a gap in the conveyor track 218 or a relatively large obstacle within the conveyor track 218.

The body 212 of the illustrated embodiment of FIGS. 12-15, 17, and 18 includes a first body portion 212a and a second body portion 212b coupled to the first body portion 212a. A first cover plate 215a can be coupled to the first body portion 212a and a second cover plate 215b can be coupled to the second body portion 212a to substantially enclose the body 212, or such cover plates 215a, 215b can be integral with the first and second body portions 212a, 212b. One of the first cover plate 215a and the second cover plate 215b in the illustrated embodiment has an aperture 217 defined therein. In the illustrated embodiment, the aperture 217 is defined in the first cover plate 215a, but in other embodiments, the aperture 217 can instead be defined in the second cover plate 215b. A third plate 219 can be positioned to at least partially cover the aperture 217. The illustrated aperture 217 is sized and positioned to at least partially receive the drive belt 222, the first pulley 225a and the second pulley 225b. The third plate 219 can inhibit entry of foreign particles and debris into the body 212.

Figure 13:
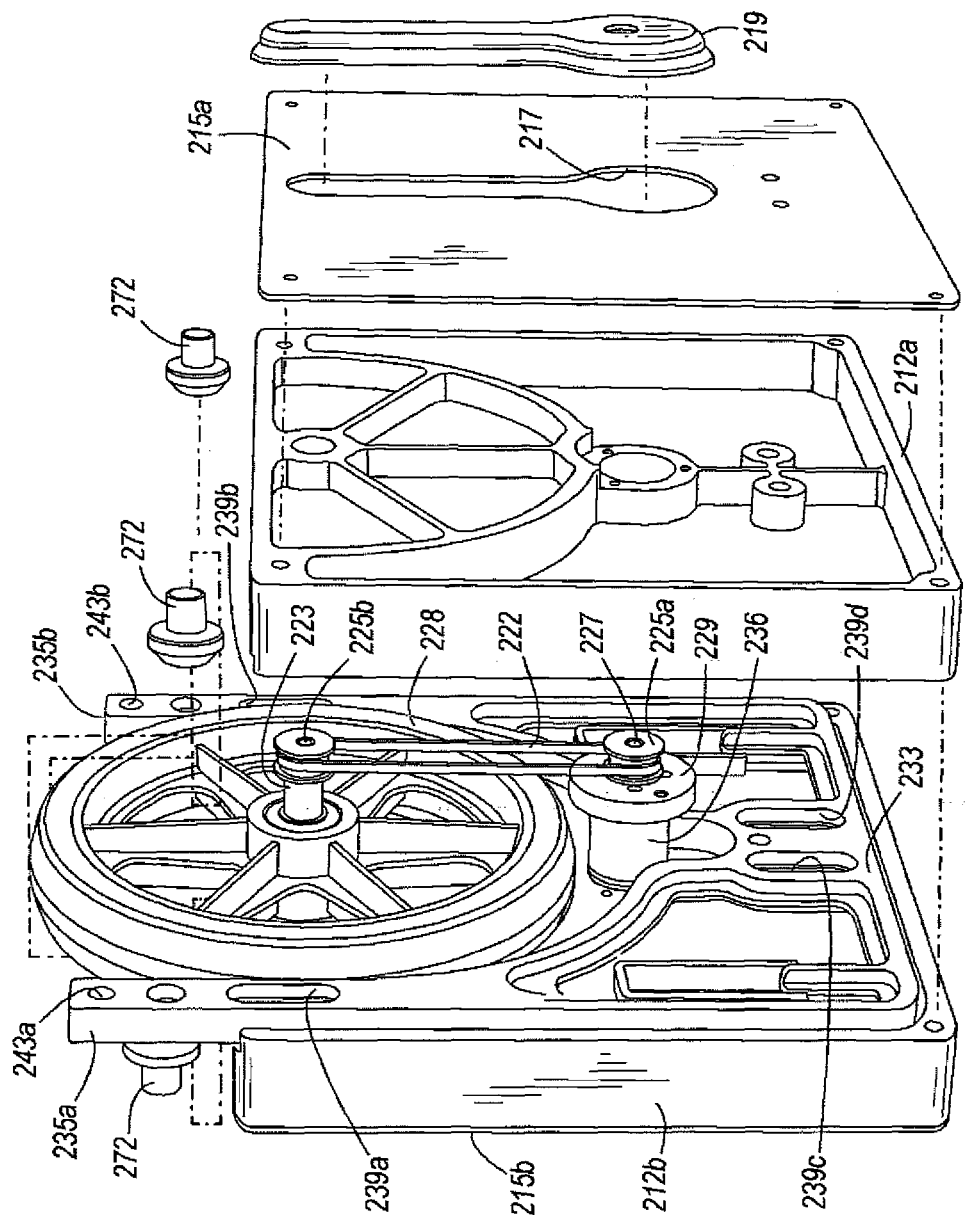
FIG. 13 is a partially exploded view of the cleaning bullet illustrated in FIG. 12.
Figure 14:
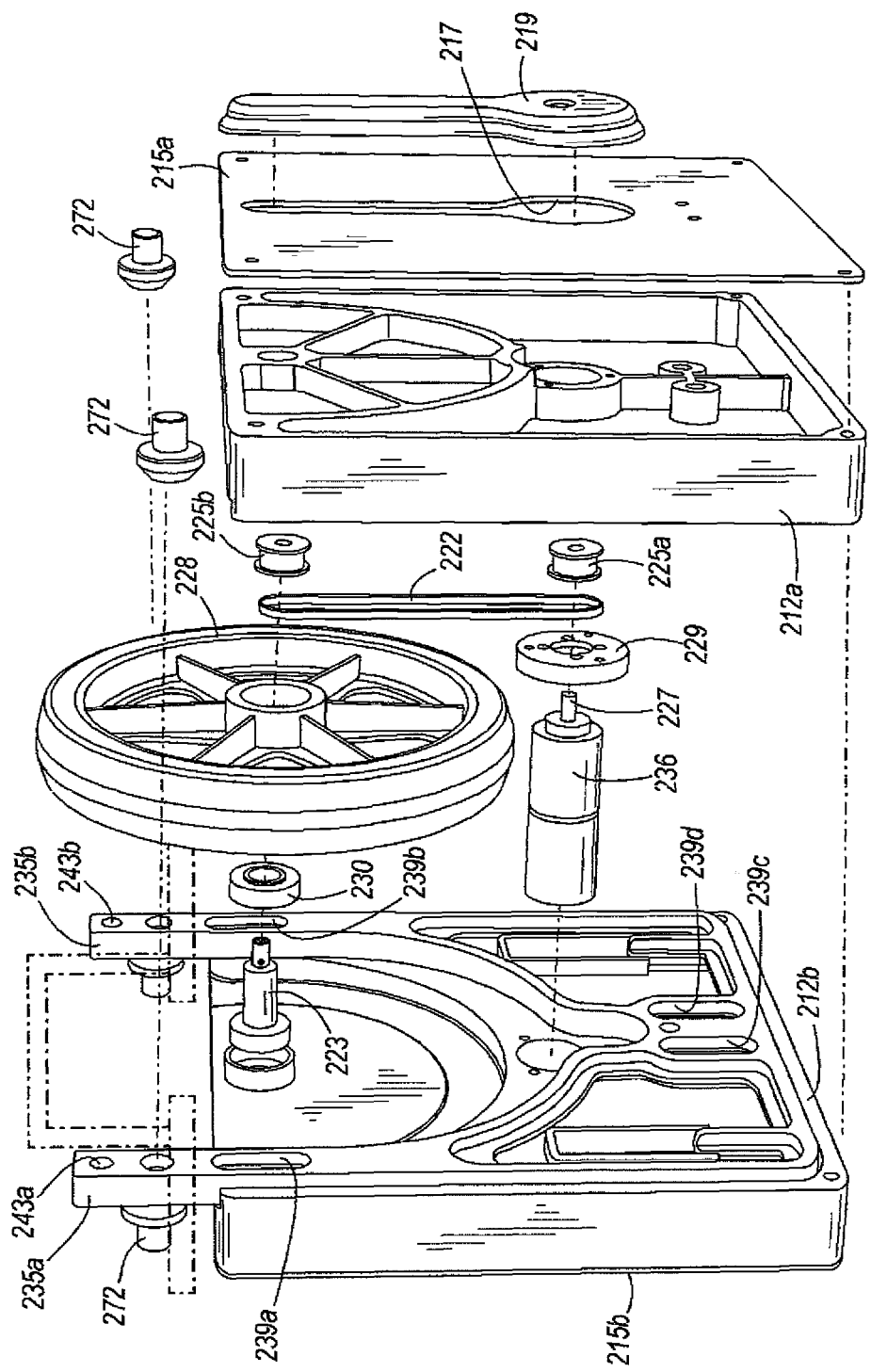
FIG. 14 is another partially exploded view of the cleaning bullet illustrated in FIGS. 12 and 13.
Figure 15:
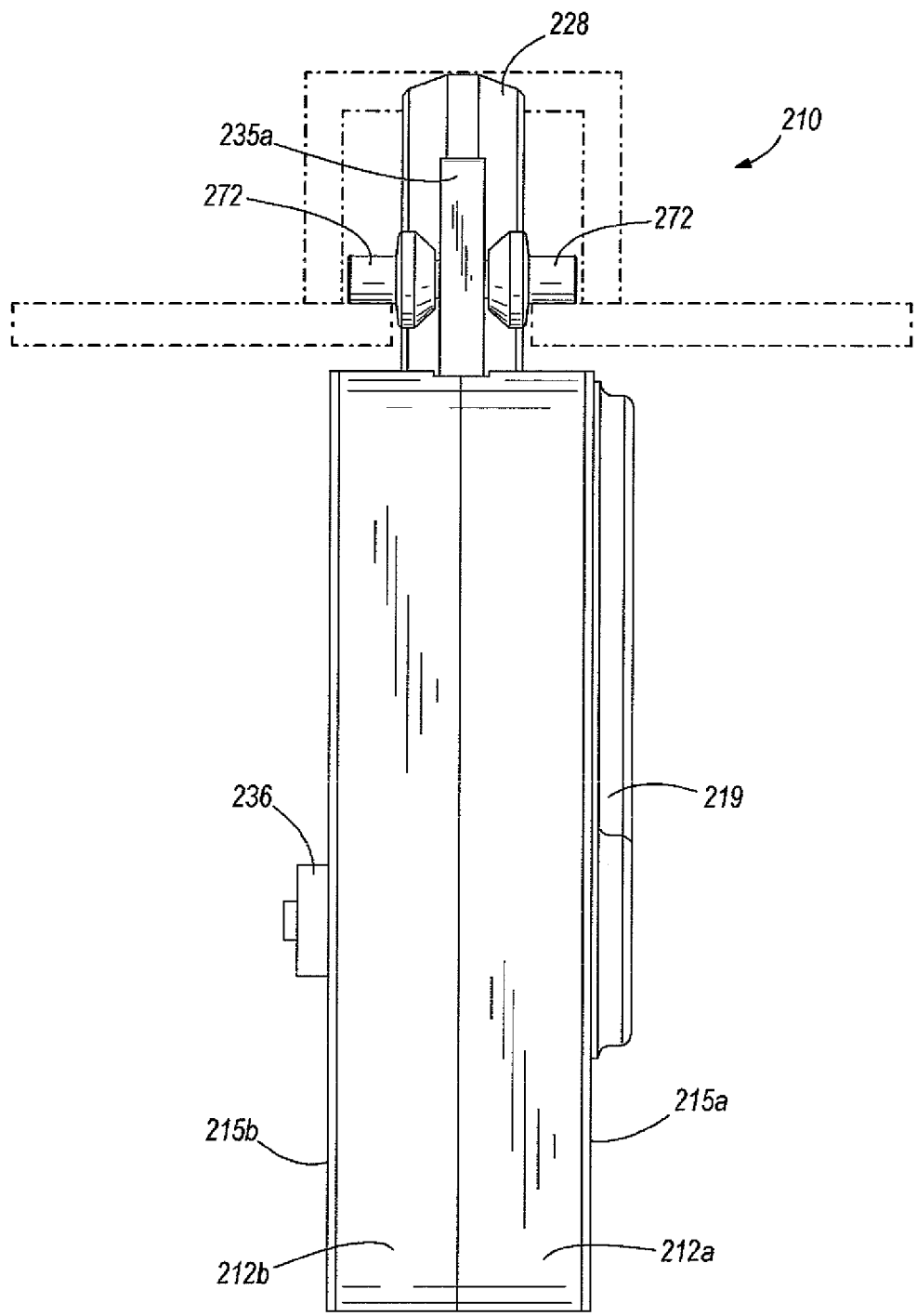
FIG. 15 is an end view of the cleaning bullet illustrated in FIGS. 12-14, shown within a conveyor track.

The motor 236 can be supported by at least one of the first body portion 212a and the second body portion 212b. In some embodiments, a motor mount 229 can be included between the motor 236 and the first body portion 212a to permit rotation of the output shaft 227, as shown in FIGS. 13 and 14.

In other embodiments, the motor mount 229 can be coupled to the second body portion 212a in addition to or in lieu of the motor mount 229 coupled to the first body portion 212a. In still other embodiments, the motor mount 229 may be omitted or can be integral with the first and/or second body portions 212a, 212b.

A support element, such as plate 233 can be positioned between the first body portion 212a and the second body portion 212b to support the wheel 228 for rotation with respect to the body portions 212a, 212b. In some embodiments, the plate 233 can extend at least partially around the wheel 228, and can include at least one protrusion extending away from the first and second body portions 212a, 212b. The illustrated embodiment includes a first protrusion 235a and a second protrusion 235b. At least one of the first and second protrusions 235a, 235b can support at least one roller 272 engaging the track 218 for rotation therealong. In the illustrated embodiment, the first and second protrusions 235a, 235b each support two rollers 272 for rotation along the track 218, thereby supporting the bullet 210 in movement along the track 218. In some embodiments, the rollers 272 are spaced from the first and second body portions 212a, 212b. The rollers 272 can support the weight of the bullet 210 on the track 218, while the wheel 228 can engage the track 218 to drive the bullet 210 along the track 218. In some embodiments, the rollers 272 can be positioned in different locations on the cleaning bullet 210. Also, in some embodiments, sliding elements 237 (shown in FIG. 17) can be utilized in addition to or in lieu of the rollers 272 to slide along the track 218.

Although the illustrated cleaning bullet of FIGS. 12-15, 17, and 18 have first and second body portions 212a, 212b and an intermediate plate 233 defining locations at which rollers 272 are attached, it will be appreciated that the structure defined by the first and second body portions 212a, 212b and intermediate plate 233 can be defined by any other number of walls or body portions while performing the same function described herein.

With continued reference to the illustrated embodiment of FIGS. 12-15, 17, and 18, at least one slot 239 can be positioned on the plate 233 to permit the plate 233 to be coupled to the first and second body portions 212a, 212b in a number of different relative positions. The at least one slot 239 permits a distance between the rollers 272 and the first and second body portions 212a, 212b to be variable, and to thus accommodate different sizes and shapes of tracks 218. Also in the illustrated embodiment, a first slot 239a is positioned on the first protrusion 235a and a second slot 239b is positioned on the second protrusion 236b. The illustrated slots 239a, 239b permit the plate 233, and therefore the rollers 272, to be positioned at any of a variety of distances from the first and second body portions 212a, 212b, and therefore can change the vertical distance between the wheel 228 and the rollers 272 to accommodate different sizes and shapes of tracks 218. In some embodiments, a third slot 239c and a fourth slot 239d can be included in the plate 233 to further stabilize the plate 233 at the desired position with respect to the first and second body portions 212a, 212b. Other arrangements that permit the plate 233 to be held at any of a variety of positions relative to the first and second body portions 212a, 212b can be utilized, slots being shown in the illustrated embodiment by way of example only.

At least one aperture 243 can be defined in at least one of the first and second protrusions 235a, 235b to at least partially receive and support a cleaning implement 231. For example, the embodiment of the cleaning bullet 210 illustrated in FIGS. 12-15, 17, and 18 includes a first aperture 243a and a second aperture 243b, such that at least one of the apertures 243a, 243b can support the cleaning implement 231 via a fastener (such as the illustrated nut 241 and bolt 243 shown in FIG. 17). This cleaning implement 231 illustrated in FIG. 17 includes an arm 245, first and second abrasive members 247a, 247b, and a sheet member 249. The nut 241 and bolt 243 described above permit the arm 245 to rotate about the first protrusion 235a. The abrasive members 247a, 247b and the sheet member 249 can be retained on the arm 245 by a fastener, such as the illustrated screw 253.

The first and second abrasive members 247a, 247b can be positioned on either side of the sheet member 249 to at least partially bolster the sheet member 249. In some embodiments, the first and second abrasive members 247a, 247b can include an abrasive fabric operable to scrape debris from the track 218. In some embodiments, the abrasive members are configured and dimensioned to provide maximum engagement with the track. As such, the abrasive members may have substantially the same shape as the track. In some embodiments, the abrasive members have substantially greater thickness than the sheet member. In some embodiments, the sheet member 249 includes a plurality of strips 251 that extend beyond the abrasive members 247a, 247b to at least partially engage the track 218. The cleaning implement 231 can be flexible and can bend or change shape to at least partially engage the track 218 regardless of the track profile. In some embodiments, such flexibility can be desirable to cleaning tracks that have a variety of cross sectional shapes.

In some embodiments, the cleaning implement 231 can be utilized such that abrasive member 247a travels down the track 218 ahead of the abrasive member 247b. In other embodiments, the abrasive member 247b can travel down the track ahead of the abrasive member 247a. In still other embodiments, the cleaning implement 231 can travel along the track 218 in a first direction and then in a second direction opposite the first direction. In these embodiments, the abrasive members 247a, 247b each have a turn to travel down the track 218 prior to the other abrasive member. In such embodiments, both sides of the cleaning implement 231 can be utilized to clean the track 218 by virtue of the flexible sheet member 249 that can bend and fold back on themselves based upon a change in direction of the cleaning bullet 210. Typically, the cleaning implement 231 would exit the end of the track to allow the flexible sheet member 249 to bend and fold back. Accordingly, in some embodiments, the cleaning implement can present the same cleaning surfaces to interior track walls regardless of the direction in which the cleaning implement travels along a track 218. In such cases, one side or surface of the cleaning implement 231 can clean interior track walls in one direction of cleaning implement movement along a track 218, and another side or surface of the cleaning implement 231 can clean interior track walls in an opposite direction of cleaning implement movement. In particular, due to the flexible sheet material folding over and covering one of the abrasive members in each direction of travel, clean surfaces of the cleaning implement are exposed upon a change in direction. For example, in operation, the sheet member may cover abrasive member 247b in a first direction of movement. However, once the cleaning member or bullet reaches the end of the track, the sheet member can fold back and cover abrasive member 247a. Due this modification at the end of the track, a clean surfaces of abrasive member 247h and the sheet member are exposed and the dirty surface of abrasive member 247a is covered by the sheet.

Figure 17:
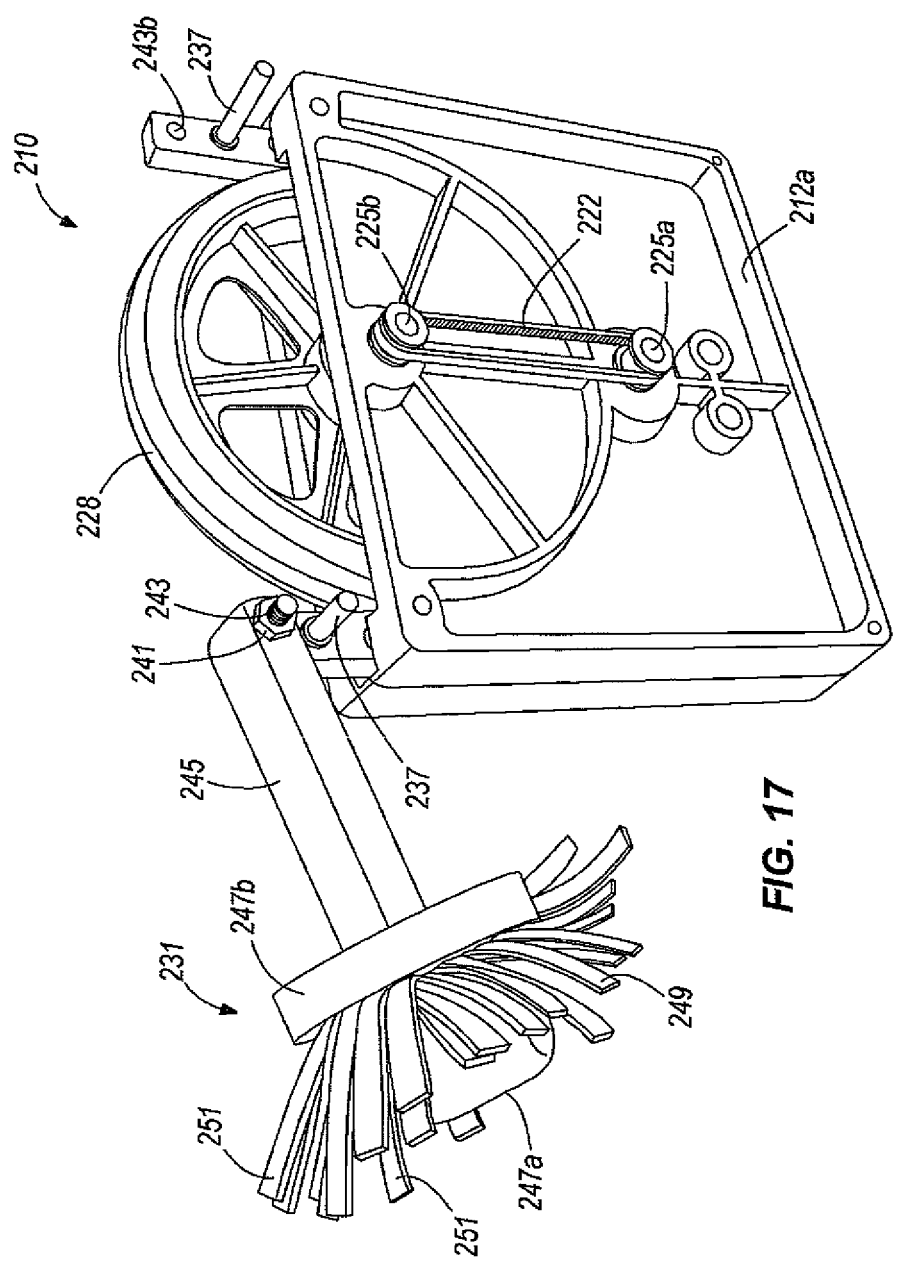
FIG. 17 is a perspective view of the cleaning bullet of FIGS. 12-15, shown provided with a cleaning implement.
Figure 18:
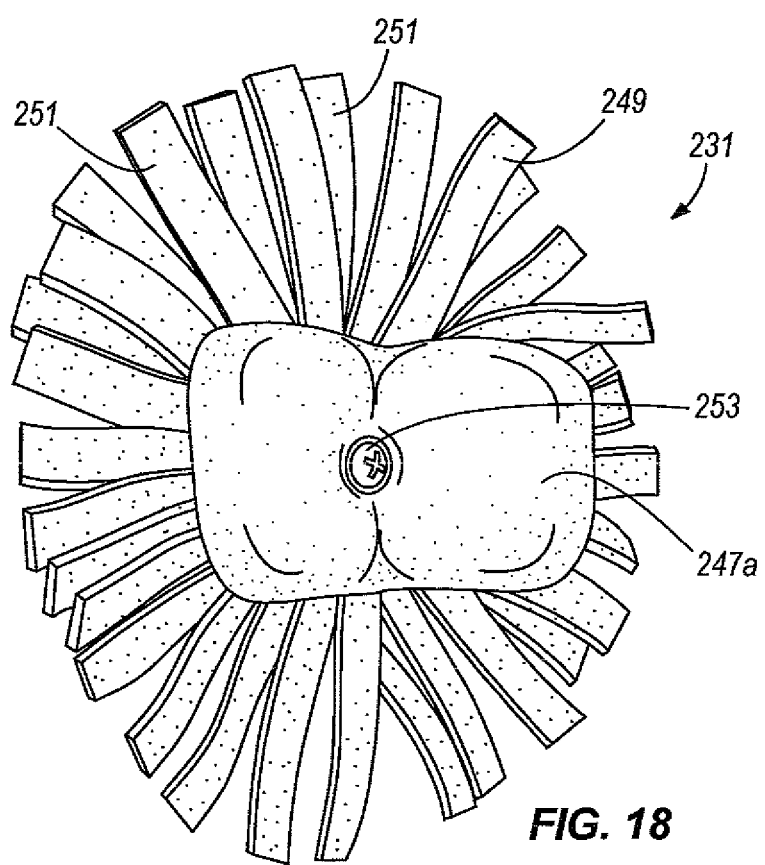
FIG. 18 is a perspective view of the cleaning implement shown in FIG. 17.

Also, in some embodiments, the cleaning implement is rotatably coupled to the rest of the cleaning bullet 210, such as the arm 245 of the cleaning implement 231 illustrated in FIGS. 17 and 18 being pivotably coupled to the rest of the cleaning bullet 210 by the nut 241 and bolt 243. The ability of the cleaning implement 231 to pivot as just described can enable the cleaning implement 231 to drop out of a conveyor track 218 that has been cleaned upon reaching the end of the conveyor track 218. In this regard, the cleaning bullet 210 can be detected by one or more sensors (not shown) positioned along and/or at ends of the conveyor track 218 to enable the sensors to determine when the cleaning bullet 210 is approaching or has passed the sensors. For example, the cleaning bullet 210 can have any number of RFID tags that can be detected by an RFID sensor positioned at the end of a conveyor track 218. When an RFID tag on the cleaning bullet 210 is detected by the RFID sensor, the sensor can trigger the cleaning bullet 210 to stop by automatically sending a wired or wireless signal to a controller of the motor 236. It will be appreciated that the location(s) of the RFID tags and the RFID sensor system can be reversed while still performing the same function just described, and that such sensors and sensing systems can be used to control movement of the cleaning bullet 210 (e.g., accelerate, decelerate, stop, start, pause) anywhere along the conveyor track 218. It will also be appreciated that other types of sensors and tags can instead be used to perform the same or similar motor control function of the cleaning bullet 210.

The cleaning implement of FIGS. 1-7 (a sheet 14 positioned on the body 12) and all other cleaning implements described and/or illustrated herein can be coupled to the cleaning bullet 210. In some embodiments, the cleaning implement of FIGS. 8-11 (a sheet 114 positioned on the second body 112b) can be coupled to the cleaning bullet 210.

Figure 19:
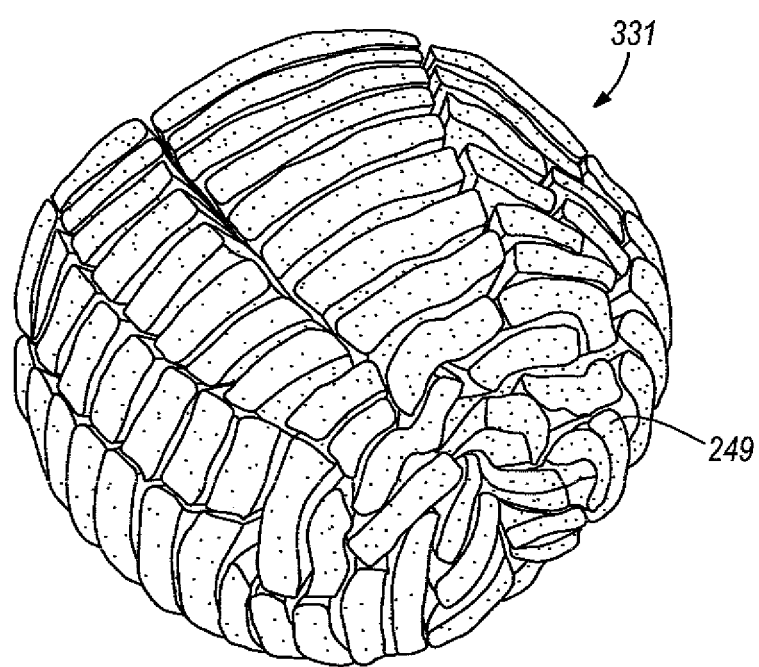
FIG. 19 is a perspective view of another cleaning bullet cleaning implement according to an embodiment of the present invention.

FIG. 19 illustrates an alternate cleaning implement 331 that comprises an absorbent member 349 for use with any of the above-described cleaning bullets 10, 110 and 210. The absorbent member 349 can be resilient to engage at least a portion of the interior walls of a conveyor track 318. In some embodiments, the absorbent member 349 can be abrasive to scrape debris off interior surfaces of the track 318. Also in some embodiments, the absorbent member 349 can be coupled to a bullet with a line or a body, as shown and described above. The absorbent member 349 can be deformed, and therefore can be utilized with any of a variety of track profiles.

FIGS. 20-22 illustrate still another embodiment of a cleaning bullet 710 with two body portions 712 and 713. Rod or support members 763 can be integrally molded to noses 716 and 765 of the cleaning bullet 710. A connecting section 767 connects noses 716 and 765 by means of the flanges 769 in both noses 716 and 765 in the connecting section. In the illustrated embodiment of FIGS. 20-22, the flanges 769 are substantially U-shaped, and can engage a track 718. A sheet 714 can at least substantially cover the rods 723.

The illustrated bullet 710 includes two bodies 712 and 713 of different geometric configurations, and offers the advantage of placement in tracks of different geometric configurations (such as a rectangular one into which body 712 would be placed and a triangular one into which body 713 would be placed), as illustrated in FIGS. 21 and 22. Those body portions 712 and 713 not placed in the tracks can serve as air traps to propel the bullet 710 along the track 718, and/or can also serve as a counterweight for the bodies.

In some embodiments, the support members 763 comprise a resilient material that can flexibly move in response to changes in track profile. The support members 763 can bias the sheet 714 against the track 718 to clean and scrub the track 718.

As stated previously, sheet 14 can be formed from a micro fiber material. Other alternative materials can also be used as described herein. All of the other sheets described herein can be made of absorbent material, and can include a fluid absorbed by the sheet for wiping onto the interior of a track. The sheets can be pre-saturated with fluid, or the fluid can be applied immediately before use (such as by spraying).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the embodiment disclosed herein includes a body draped with a disposable sheet. Alternative embodiments can include a nondisposable sheet that is reused or the entire device including the body can be disposable without departing from the scope of the invention. Various other alternatives to certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

What is claimed is:

1. A cleaning bullet for use in a track, the track comprising an elongate path along which items to be conveyed are moveable, the cleaning bullet comprising:
   a body operable to move along the track;
   at least one wheel coupled to the body and engaging the track;
   a motor disposed outside the track and operably coupled to the at least one wheel to rotate the wheel and move the body and wheel along the track, the motor moveable with the body alone the track; and
   a power source coupled to the motor.

2. The cleaning bullet of claim 1, further comprising a flexible sheet coupled to the body to engage and clean an interior surface of the track in movement of the body.

3. The cleaning bullet of claim 1, wherein the at least one wheel is releasably engaged with an internal surface of the track.

4. The cleaning bullet of claim 1, further comprising a roller coupled to the body and positioned to releasably engage an internal surface of the track to retain the at least one wheel within the track.

5. The cleaning bullet of claim 1, wherein the body is suspended from the track in use, and is adjustable to different positions with respect to the track.

6. The cleaning bullet of claim 1, wherein the at least one wheel is coupled to the motor by a flexible member.

7. The cleaning bullet of claim 1, further comprising a cleaning implement coupled to the body for rotation relative to the body, the cleaning implement including at least one of an abrasive member and a flexible sheet.

8. The cleaning bullet of claim 1, further comprising an absorbent pad coupled to the body, and compressible to engage multiple interior surfaces of the track.

9. A cleaning bullet for cleaning at least one surface of a track, the cleaning bullet comprising:
   a body operable to move along the track in at least a first direction;
   a cleaning implement coupled to the body for rotation relative to the body, the cleaning implement comprising at least one abrasive member and at least one flexible sheet operable to engage an interior surface of the track;

a motor operable to move the body and cleaning implement along the track in the first direction.

10. The cleaning bullet of claim 9, further comprising a cleaning fluid applied to at least one of the abrasive member and flexible sheet to assist in cleaning the track.

11. The cleaning bullet of claim 9, wherein the at least one abrasive member comprises a first abrasive member and a second abrasive member, and the at least one flexible sheet comprises a plurality of flexible strips.

12. The cleaning bullet of claim 11, wherein the plurality of flexible strips are positioned between the first abrasive member and the second abrasive member.

13. The cleaning bullet of claim 12, wherein the cleaning implement is rotatable between a first position when the body moves in the first direction and a second position when the body moves in a second direction opposite the first direction.

14. The cleaning bullet of claim 13, wherein the cleaning implement is movable in the first direction within the track in which the first abrasive member leads the second abrasive member along the track and wherein the sheet substantially covers the second abrasive member, and is movable in the second direction within the track in which the second abrasive member leads the first abrasive member along the track and wherein the sheet substantially covers the first abrasive member.

15. A method of cleaning a track with a cleaning bullet, the method comprising:
   inserting a cleaning bullet into the track;
   moving the cleaning bullet along the track in a first direction with a motor, the motor disposed outside the track and moveable with the cleaning bullet along the track;
   supplying power to the motor with a power source carried by the cleaning bullet; and
   rubbing at least one interior surface of the track with at least one of a sheet member and an abrasive member as the cleaning bullet moves along the track.

16. The method of claim 15, further comprising applying cleaning fluid to the sheet member.

17. The method of claim 15, further comprising biasing the at least one of the sheet member and the abrasive member against the at least one interior surface of the track.

18. The method of claim 15, further comprising positioning a first wheel adjacent a first track surface and positioning a second wheel adjacent a second track surface, such that rotation of the first and second wheels moves the cleaning bullet along the track.

19. The method of claim 15, further comprising removing the cleaning bullet from the track after moving along the track for a distance, allowing at least a portion of the cleaning bullet to adjust to provide a clean surface, reinserting the cleaning bullet into the track, and moving the cleaning bullet along the track in a second direction opposite the first direction.

20. The method of claim 15, further comprising coupling the at least one of the sheet member and the abrasive member to a cleaning bullet body with a flexible member, such that a distance between the one of the sheet member and the abrasive member and the cleaning bullet body is adjustable.

* * * * *